US011970239B2

(12) United States Patent (10) Patent No.: US 11,970,239 B2
McGowan (45) Date of Patent: Apr. 30, 2024

(54) VEHICLE SYSTEM INCLUDING FOOT-DECK-BASED VEHICLE AND SEAT ACCESSORY STRUCTURE

(71) Applicant: Yvolve Sports Ltd., Dublin (IE)

(72) Inventor: John McGowan, Balbriggan (IE)

(73) Assignee: YVOLVE SPORTS LIMITED, Dublin (IE)

( * ) Notice: Subject to any disclaimer, the term of this patent is extended or adjusted under 35 U.S.C. 154(b) by 755 days.

(21) Appl. No.: 17/076,000

(22) Filed: Oct. 21, 2020

(65) Prior Publication Data

US 2022/0119068 A1 Apr. 21, 2022

(51) Int. Cl.
| | | |
|---|---|---|
| B62K 5/08 | (2006.01) | |
| B62B 3/02 | (2006.01) | |
| B62B 7/14 | (2006.01) | |
| B62K 3/00 | (2006.01) | |

(52) U.S. Cl.
CPC ............... B62K 5/08 (2013.01); B62B 3/02 (2013.01); B62B 7/14 (2013.01); *B62K 3/002* (2013.01)

(58) Field of Classification Search
CPC .......... B62K 5/08; B62K 3/002; B62K 13/08; B62K 9/00; B62K 13/06; B62K 21/24; B62K 5/02; B62K 21/16; B62B 3/02; B62B 7/14; B62B 7/006; B62B 2206/006; B62B 5/082; B62B 7/12; B62B 7/04; B62B 9/10; B62B 9/102; B62B 9/20; B62J 1/08; B62J 1/12; B62J 9/14; B62J 25/04; B62L 1/04
See application file for complete search history.

(56) References Cited

U.S. PATENT DOCUMENTS

| | | | | |
|---|---|---|---|---|
| 6,089,586 A | * | 7/2000 | Rudell | B62K 9/02 280/282 |
| 9,783,253 B2 | * | 10/2017 | Ouboter | B62K 13/00 |
| 2011/0198819 A1 | * | 8/2011 | Jessie, Jr. | B62K 9/00 280/7.15 |
| 2012/0211955 A1 | * | 8/2012 | Herlitz | B62K 9/00 280/33.998 |

(Continued)

FOREIGN PATENT DOCUMENTS

| | | | | |
|---|---|---|---|---|
| CN | 209719703 U | * | 12/2019 | ............... B62B 7/12 |
| CN | 209938836 U | * | 1/2020 | |

(Continued)

*Primary Examiner* — James A Shriver, II
*Assistant Examiner* — Ian Bryce Shelton
(74) *Attorney, Agent, or Firm* — Aird & McBurney LP

(57) ABSTRACT

According to an aspect, there is provided a vehicle system that includes a foot-deck-based vehicle and a seat accessory structure. The foot-deck-based vehicle includes a foot deck, a handle structure and a plurality of wheels. The foot deck is positioned to support—a user and includes a first handle structure receiving feature. The handle structure is detachably connectable to the first handle structure receiving feature. The seat accessory structure has a seat body and is detachably connectable to the foot deck so as to form a seat-based vehicle. The seat accessory structure has a second handle structure receiving feature thereon. The handle structure is detachably connectable to the second handle structure receiving feature, so as to be positioned for gripping by a secondary person when the secondary person is urging the seat-based vehicle to roll on the ground surface while the user is seated on the seat body.

17 Claims, 9 Drawing Sheets

(56) References Cited

U.S. PATENT DOCUMENTS

| | | | | |
|---|---|---|---|---|
| 2014/0217685 A1* | 8/2014 | Byrne | .................... | B62K 13/00 |
| | | | | 280/7.15 |
| 2016/0152296 A1* | 6/2016 | Eckert | .................... | B62K 21/12 |
| | | | | 280/87.041 |
| 2016/0318539 A1* | 11/2016 | Joos | .......................... | B62J 9/20 |
| 2017/0101153 A1* | 4/2017 | Eckert | .................... | B62K 13/08 |
| 2017/0106932 A1* | 4/2017 | Mazoyer | .............. | B62K 15/006 |
| 2017/0291629 A1* | 10/2017 | O Connell | ........... | B62K 15/006 |
| 2020/0130767 A1* | 4/2020 | Owen | ..................... | B62K 5/08 |
| 2020/0156728 A1* | 5/2020 | Mazoyer | ................ | B62K 21/24 |

FOREIGN PATENT DOCUMENTS

| | | | | | |
|---|---|---|---|---|---|
| CN | 111152874 | A | * | 5/2020 | |
| DE | 102013106634 | A1 | * | 10/2014 | ................ B62J 1/08 |
| JP | 3173452 | U | * | 2/2012 | ............. A63H 17/18 |
| WO | WO-2015092023 | A2 | * | 6/2015 | ............. B62B 7/006 |

\* cited by examiner

VEHICLE SYSTEM INCLUDING FOOT-DECK-BASED VEHICLE AND SEAT ACCESSORY STRUCTURE

FIELD OF THE DISCLOSURE

The specification relates generally to foot-deck-based vehicles and more particularly to conversion of a foot-deck-based vehicle to a seat-based vehicle.

BACKGROUND OF THE DISCLOSURE

Vehicles, such as foot-deck-based vehicles, such as scooters (also known as kick scooters), have become very popular. However, scooters are not easily usable by young children. As a result, parents of a young child may purchase another vehicle such as a seat-based vehicle that is easier to use by the young child. When the child is very young, the parents may purchase a different kind of vehicle that permits the parent to control the vehicle via a rear-mounted handlebar. As a result, the parents end up purchasing several different vehicles for the child, to accommodate each stage of the child's development. This can be expensive and such vehicles can occupy a significant amount of space.

It would be advantageous to provide a vehicle that is convertible at least between a seat-based vehicle and a foot-deck-based vehicle.

SUMMARY OF THE DISCLOSURE

According to an aspect, there is provided a vehicle system that includes a foot-deck-based vehicle and a seat accessory structure. The foot-deck-based vehicle includes a foot deck, a handle structure and a plurality of foot-deck-based vehicle wheels. The foot deck is positioned to support—a user and includes a first handle structure receiving feature. The handle structure is detachably connectable to the first handle structure receiving feature, so as to be positioned for gripping by the user when the user is standing on the foot deck. The plurality of foot-deck-based vehicle wheels are positioned to support the foot-deck-based vehicle for rolling on a ground surface. The seat accessory structure has a seat body and is detachably connectable to the foot deck so as to form a seat-based vehicle in which the seat body is positioned to support the user. The seat accessory structure has a second handle structure receiving feature thereon. The handle structure is detachably connectable to the second handle structure receiving feature, so as to be positioned for gripping by a secondary person when the secondary person is urging the seat-based vehicle to roll on the ground surface while the user is seated on the seat body.

In another embodiment, there is provided a vehicle system that includes a foot-deck-based vehicle and a seat accessory structure. The foot-deck-based vehicle includes a foot deck, positioned to support—a user, a handle structure that is connected to the foot deck so as to be positioned for gripping by the user when the user is standing on the foot deck and a plurality of foot-deck-based vehicle wheels positioned to support the foot-deck-based vehicle for rolling on a ground surface. The seat accessory structure has a seat body. The seat accessory structure is detachably connectable to the foot-deck-based vehicle so as to form a seat-based vehicle in which the seat body is positioned to support the user. The seat accessory structure includes at least one seat accessory structure wheel that is positioned to cooperate with a first subset of the plurality of foot-deck-based vehicle wheels. The foot-deck-based vehicle includes a first mounting surface and the seat accessory structure includes a second mounting surface that is engageable with the first mounting surface to detachably connect the seat accessory structure to the foot-deck-based vehicle. The first and second mounting surfaces are positioned such that a second subset of the plurality of foot-deck-based vehicle wheels is raised off the ground surface when the seat accessory structure is connected to the foot-deck-based vehicle via the first and second mounting surfaces.

Other advantages and innovations are described in the present disclosure.

BRIEF DESCRIPTION OF THE DRAWINGS

Embodiments will now be described, by way of example only, with reference to the attached figures.

DETAILED DESCRIPTION

Figure 1:
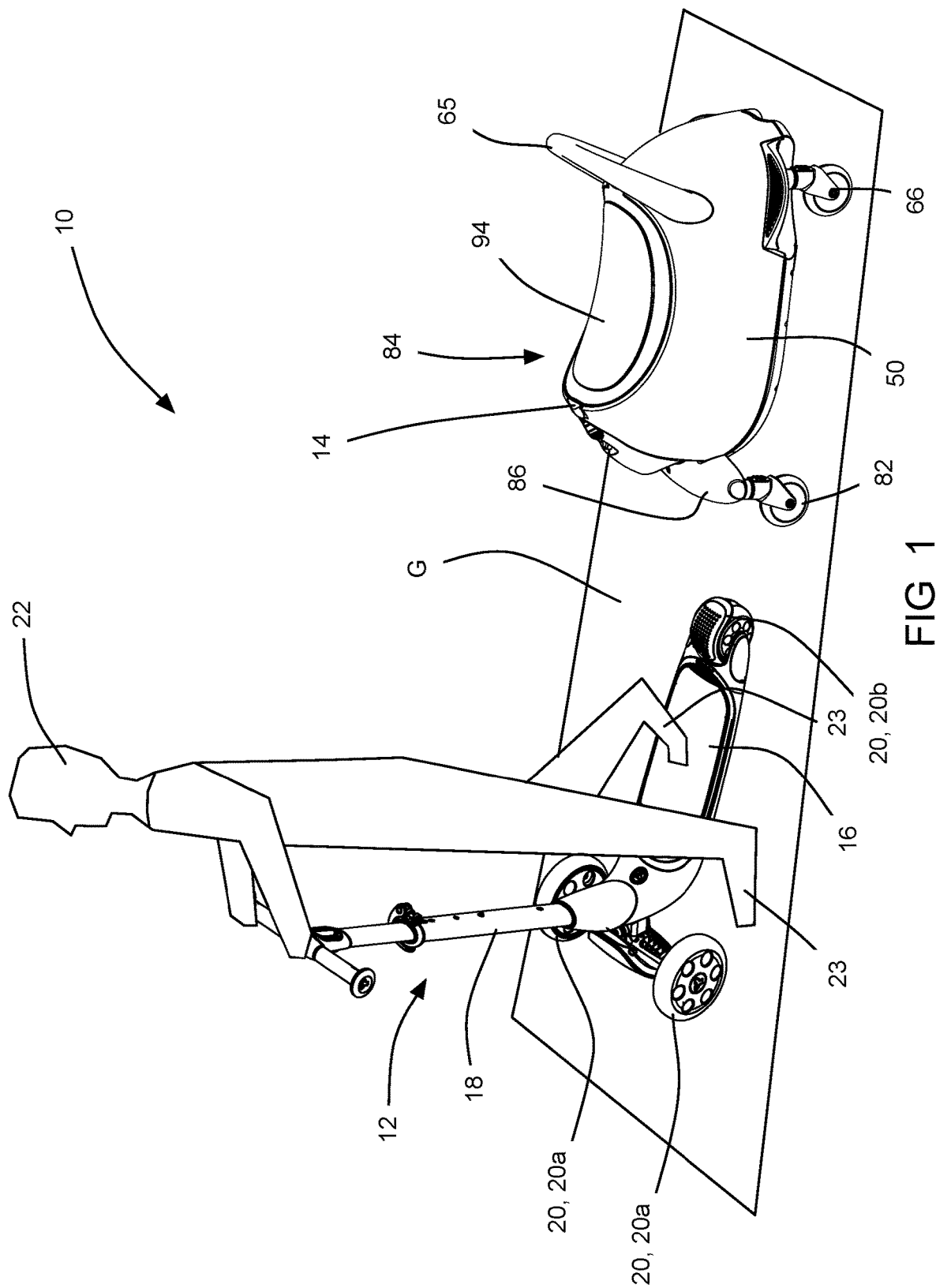
FIG. 1 is a perspective view of a vehicle system in accordance with an embodiment of the present disclosure, illustrating a foot-deck-based vehicle and a seat-based vehicle.

It is to be understood that the terms "couple", "coupled", "connect", "connected" are not limited to direct mating between the described components, but also contemplate the use of intermediate components to achieve the connection or coupling.

For simplicity and clarity of illustration, where considered appropriate, reference numerals may be repeated among the Figures to indicate corresponding or analogous elements. In addition, numerous specific details are set forth in order to provide a thorough understanding of the embodiment or embodiments described herein. However, it will be understood by those of ordinary skill in the art that the embodiments described herein may be practiced without these specific details. In other instances, well-known methods, procedures and components have not been described in detail so as not to obscure the embodiments described herein. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description. It will also be noted that the use of the term "a" will be understood to denote "at least one" in all instances unless explicitly stated otherwise or unless it would be understood to be obvious that it must mean "one".

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Figure 2:
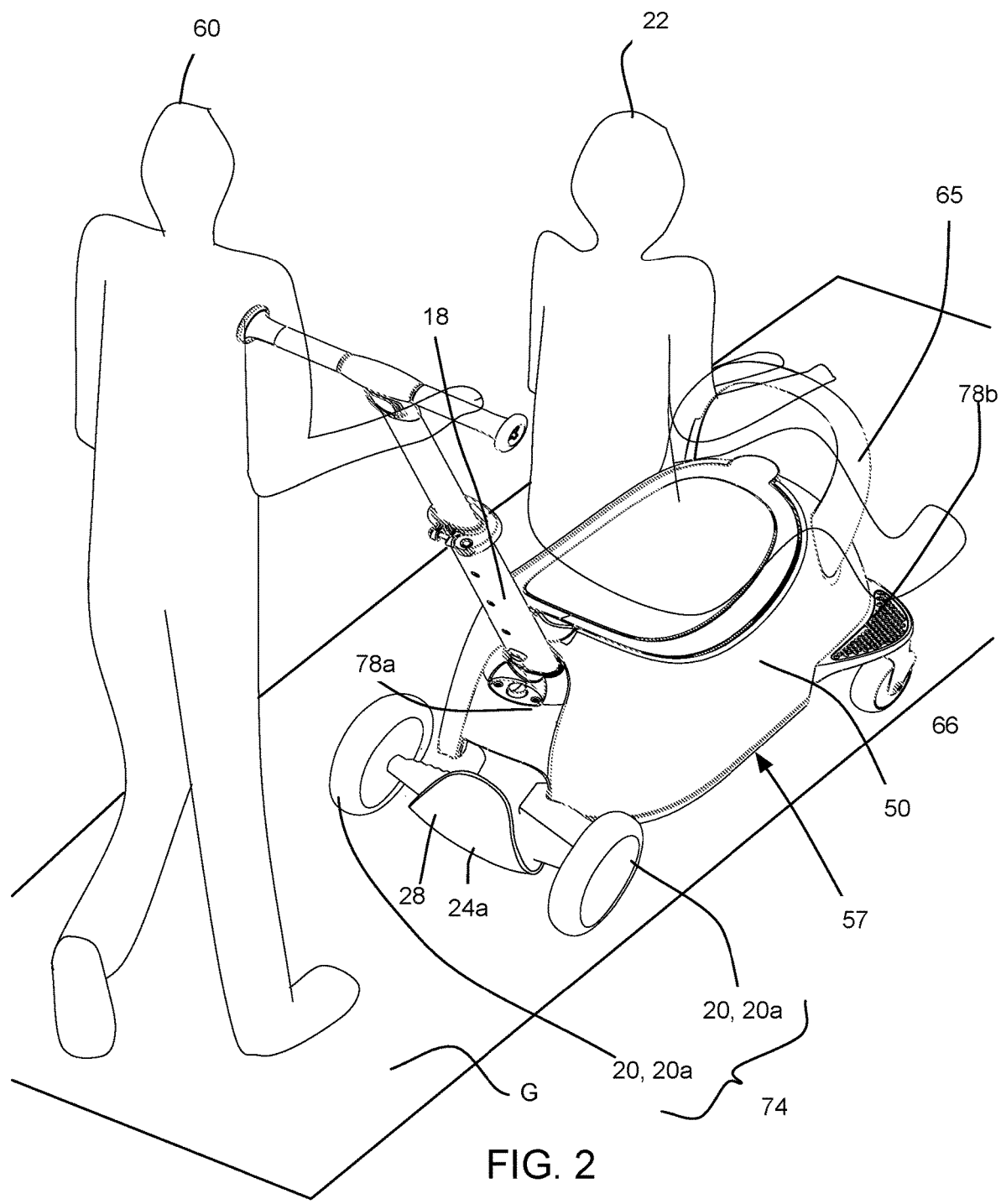
FIG. 2 is a perspective view of another seat-based vehicle that can be created using the vehicle system shown in FIG. 1.

Reference is made to FIGS. 1 and 2, which is a perspective view of a vehicle system 10 in accordance with an embodiment of the present. The vehicle system 10 includes a foot-deck-based vehicle 12, and a seat accessory structure 14. The foot-deck-based vehicle 12 may be, for example, a scooter, as shown in FIG. 1, or it may be any other suitable type of vehicle. The foot-deck-based vehicle 12 includes a foot deck 16, a handle structure 18, and a plurality of foot-deck-based vehicle wheels 20 positioned to support the foot-deck-based vehicle 12 for rolling on a ground surface G.

Figure 4:
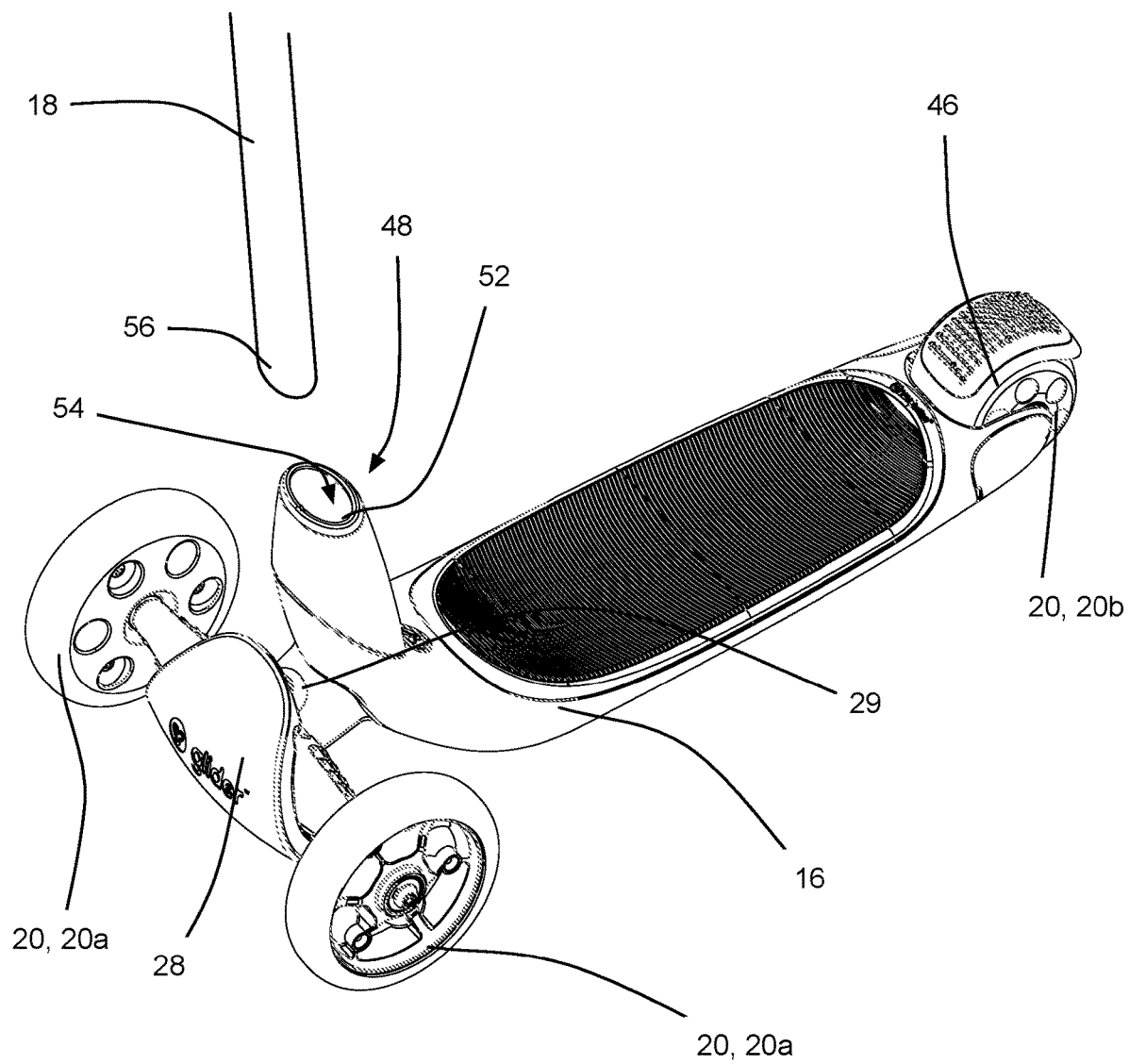
FIG. 4 is a perspective exploded view of the foot-deck-based vehicle shown in FIG. 1.

The foot deck 16 is positioned to support a user shown schematically at 22 in FIGS. 1 and 2. The foot deck 16 may be a generally planar, generally but not necessarily strictly horizontally extending portion of the foot-deck-based vehicle 12. The foot deck 16 in the foot-deck-based vehicle 16 shown in FIGS. 1 and 4 has a ribbed, rubberized top surface in order to inhibit slippage of the user's feet (shown at 23) when the user's feet 23 are placed thereon. In alternative embodiments, the ribbed, rubberized surface need not be provided. The foot deck 16 has a first end 24a and a second end 24b, and a first side 25a and a second side 25b.

Figure 3:
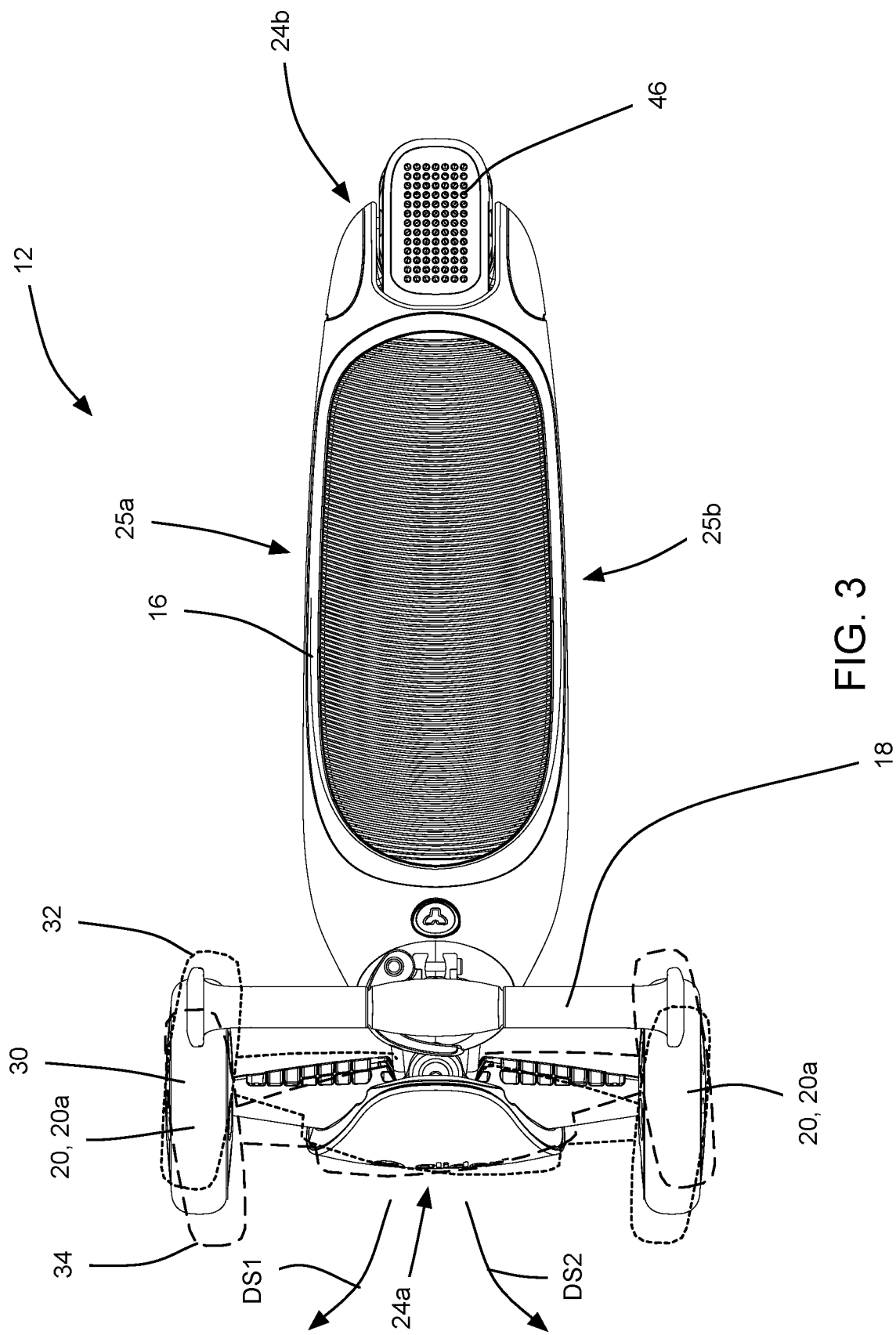
FIG. 3 is a plan view of the foot-deck-based vehicle shown in FIG. 1.

The plurality of foot-deck-based vehicle wheels 20 optionally include at least one front wheel 20a and at least one rear wheel 20b. In the example shown there are two front wheels 20a and one rear wheel 20b. The two front wheels may be connected to the foot deck 16 via a lean-to-steer mechanism 26. The lean-to-steer mechanism 26 may be any suitable type of lean-to-steer mechanism that is known in the art of scooters and skateboards. For example, the lean-to-steer mechanism 26 may include a front wheel support 28 (FIG. 4) that has the front wheels 20a rotatably connected thereto, and which is pivotally connected to the foot deck 16 by a pin 29 that passes through both the front wheel support 28 and a projection on the foot deck 16, for pivoting movement about a front wheel support pivot axis Afws (FIG. 7B) that is at an angle of greater than 0 degrees and less than 90 degrees from a vertical axis (shown at Av) such that leaning on the first side 25a of the foot deck 16 causes pivoting of the front wheel support 28 in a first pivot direction, thereby steering the foot-deck-based vehicle 12 in a first steering direction DS1, and leaning on the second side 25b of the foot deck 16 causes pivoting of the front wheel support 28 in a second pivot direction, thereby steering the foot-deck-based vehicle 12 in a second steering direction DS2. The angle of the front wheel support pivot axis Afws may be any suitable angle, such as an angle of about 20 degrees from the vertical axis Av. In FIG. 3, the front wheel support 28 is shown at 30 in a neutral position in which the front wheel support 28 is oriented to steer the foot-deck-based vehicle 12 straight ahead, is shown as a short-dashed outline 32, in a position in order to steer the foot-deck-based vehicle 12 in the first steering direction DS1, and is shown as a long-dashed outline 34, in a position in order to steer the foot-deck-based vehicle 12 in the second steering direction DS2.

Figure 7A:
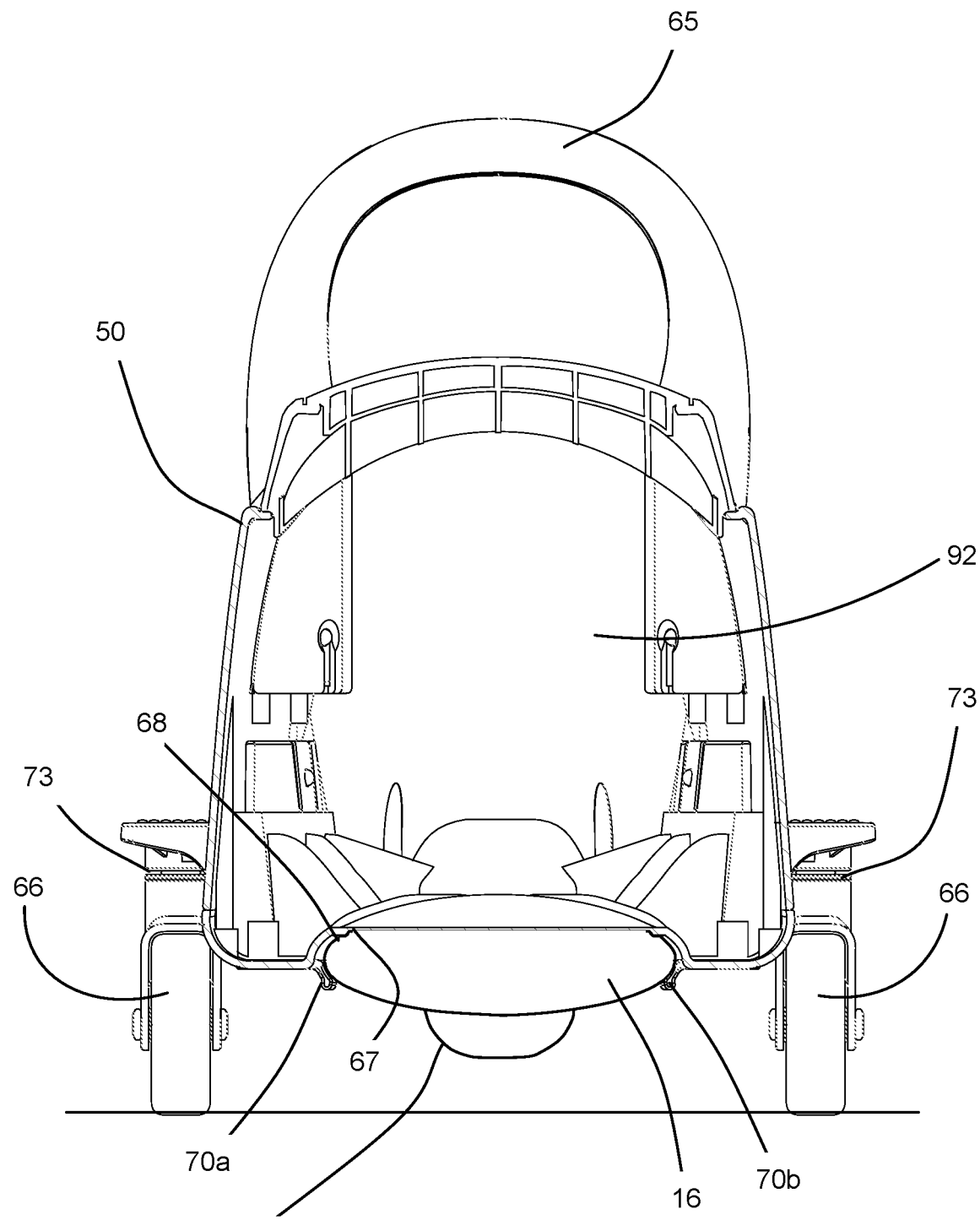
FIG. 7A is a sectional end elevation view of the seat-based vehicle shown in FIG. 2.
Figure 7B:
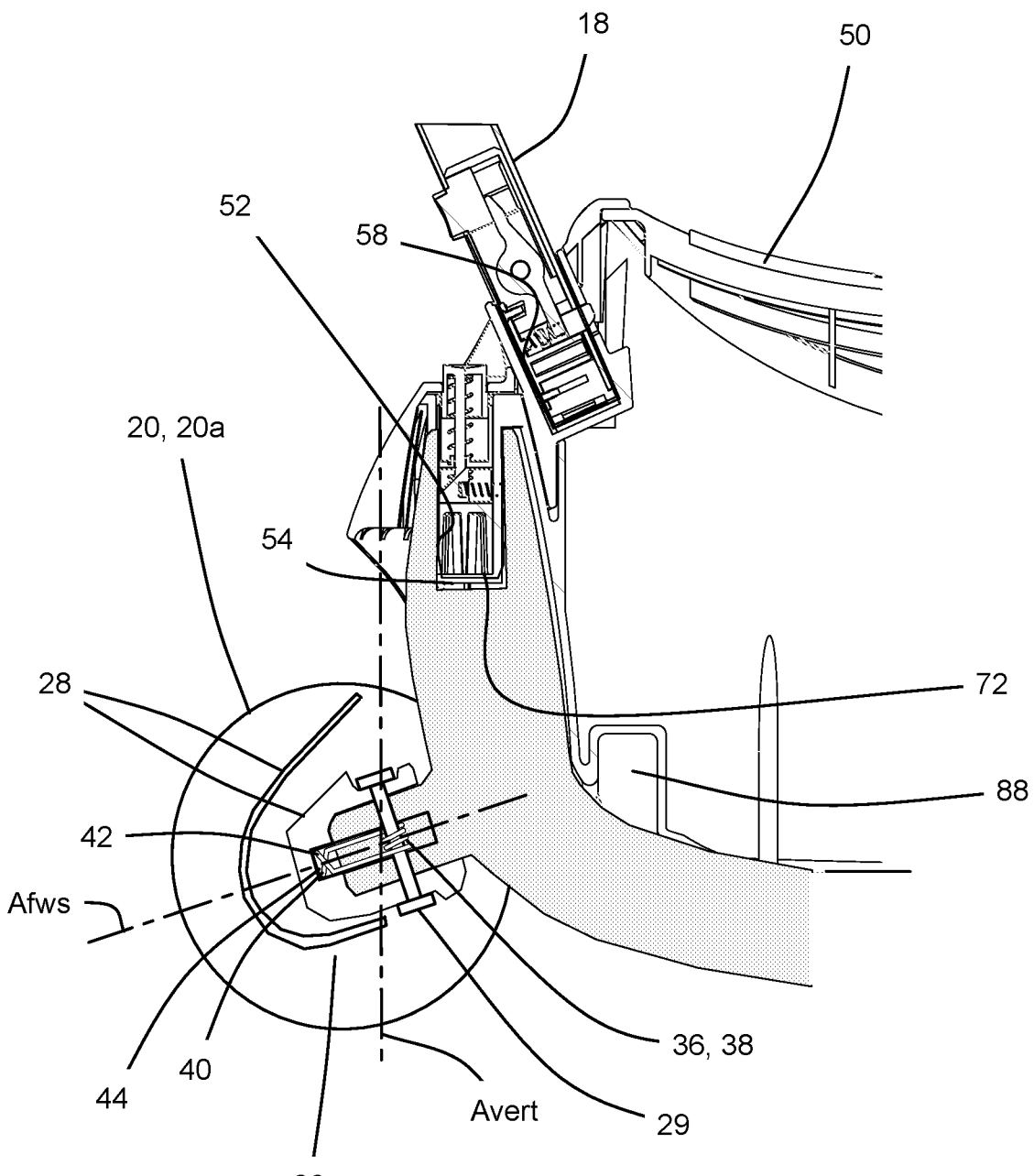
FIG. 7B is another sectional side elevation view of the seat-based vehicle shown in FIG. 2.

A biasing member 36 shown in FIG. 7B is provided to urge the front wheel support 28 towards the neutral position 30. The biasing member 36 may be any suitable type of biasing member, such as a spring, or an elastomeric member. In the example shown in FIG. 7B, the biasing member 36 is a torsion spring 38 with a core that wraps around the pin 29 and which has first and second spring ends 40 and 42 that extend into a pocket 44 in the front wheel support 28. During pivoting of the front wheel support 28 about the front wheel support pivot axis Afws, one of the first and second spring ends 40 and 42 is flexed and thus urges the front wheel support 28 back towards the neutral position shown in FIG. 3.

The two front wheels 20a are rotatably connected to the front wheel support 28.

The rear wheel 20b may be rotatably connected directly to the foot deck 16. A brake 46 may be provided, as is known in the art of scooters. The brake 46 may be a cover that extends over the rear wheel 20b and which can be resiliently pressed down so as to frictionally engage the rear wheel 20b during rolling of the foot-deck-based vehicle 12.

The foot deck 16 includes a first handle structure receiving feature 48 that is positioned and shaped to receive the handle structure 18. In the embodiment shown, the first handle structure receiving feature 48 is at the first end 24a of the foot deck 16.

When using the foot-deck-based vehicle 12, the user stands on the foot deck 16 generally facing the first end 24a of the foot deck 16, and grips the handle structure 18. The user 22 may have one foot 23 on the foot deck 16 and one foot 23 on the ground surface G to push the user and the foot-deck-based vehicle 12 forward, as is done with a traditional kick scooter.

The handle structure 18 is detachably connectable to the first handle structure receiving feature 48. In the position shown in FIG. 1, the handle structure 18 is connected to the first handle structure receiving feature 48. In the position shown in FIG. 4, the handle structure 18 is detached from the first handle structure receiving feature 48. To provide the detachable connectability, the first handle structure receiving feature 48 may include a wall 52 with a receiving aperture 54 (FIG. 4), and the handle structure 18 may include a handle structure projection 56 that is shaped to extend snugly into the receiving aperture 54. A push-button shown at 59 in FIG. 6 may be provided and is pressable. When the push-button 59 is not depressed it may be said to be in a locking position, since in this position a locking member on the handle structure 18 (wherein the locking member is not shown) engages a latching surface on the foot deck 16 (wherein the latching surface is not shown) in the foot deck 16 to prevent the handle structure from inadvertently being removed from the first handle structure receiving feature 48 during operation of the foot-deck-based vehicle 12 by the user 22. Pressing the push-button 59 releases the locking member from the latching surface. Thus the depressed position for the push-button 59 may be referred to as a release position. The push-button 59 may be biased by a spring or any other elastic element towards the locking position.

When the handle structure 18 is connected to the first handle structure receiving feature 48, the handle structure 18 is positioned for gripping by the user 22 when the user 22 is standing on the foot deck 16, as shown in FIG. 1.

The seat accessory structure 14 includes a seat body 50, and is detachably connectable to the foot deck 16 so as to form a seat-based vehicle 57 in which the seat body 50 is positioned to support the user 22 as shown in FIG. 2. As can be seen in FIG. 2, the user 22 is in a seated position on the seat body 50.

Figure 5:
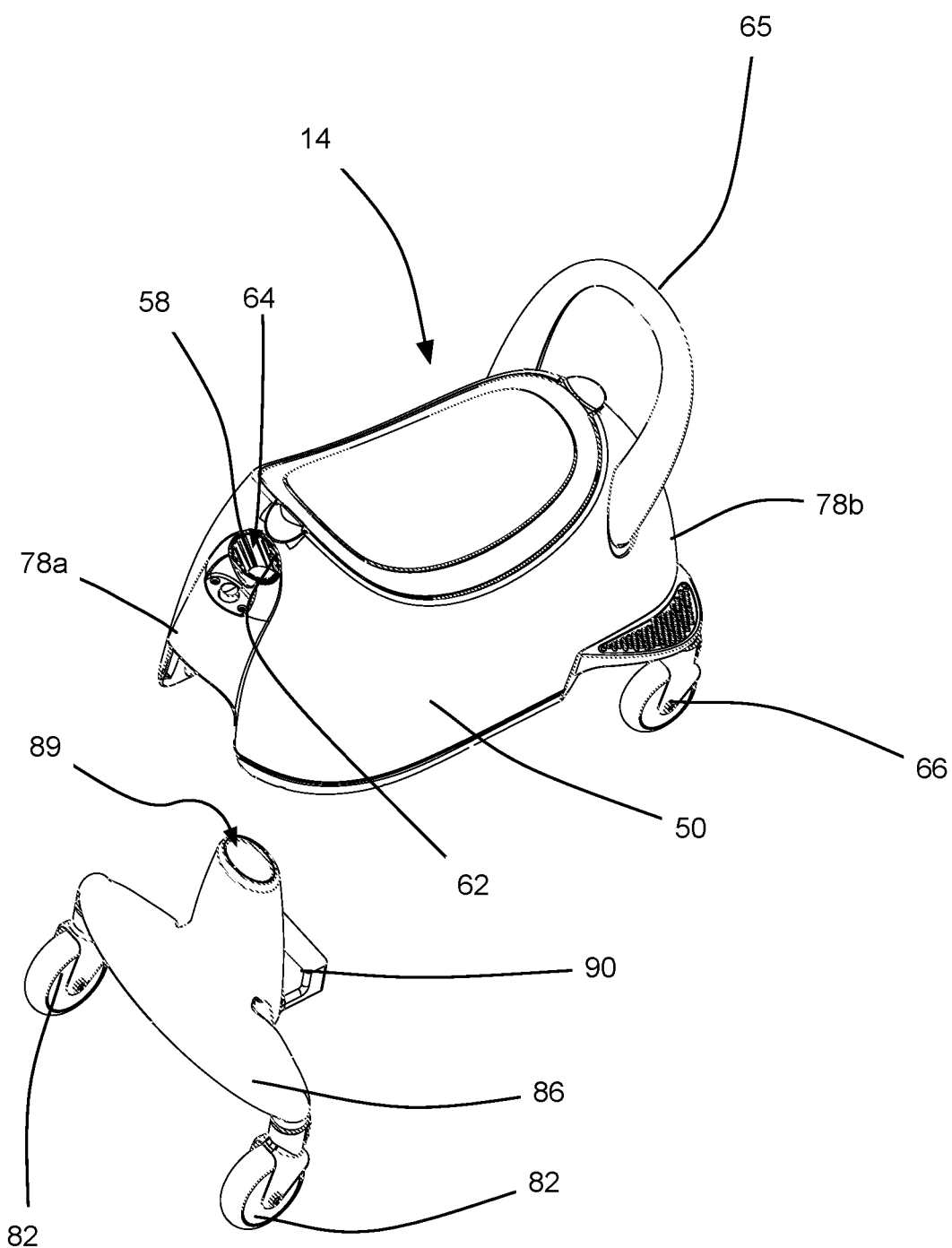
FIG. 5 is a perspective view of the seat-based vehicle shown in FIG. 1 during a stage of conversion for mounting to the foot-deck-based vehicle.

In some embodiments, the seat accessory structure 14 has a second handle structure receiving feature 58 thereon (FIGS. 2, 5 and 7B). The handle structure 18 is detachably connectable to the second handle structure receiving feature 58, so as to be positioned for gripping by a secondary person 60 when the secondary person 60 is urging the seat-based vehicle 57 to roll on the ground surface while the user 22 is seated on the seat body 50. The user 22 and the secondary person 60 are shown only schematically in FIG. 2, and are transparent so as not to obscure elements of the seat-based vehicle 57.

In the embodiment shown, the second handle structure receiving feature 58 is at the first end of the foot deck 16. The second handle structure receiving feature 58 may be similar in configuration to the first handle structure receiving feature 48. As shown in FIGS. 5 and 7B, the first handle structure receiving feature 48 may include a wall 62 with a receiving aperture 64, and the handle structure projection 56 is shaped to extend snugly into the receiving aperture 64. The second handle structure receiving feature 58 may have a latching surface that is similar to the latching surface described above for the first handle structure receiving feature 48. Accordingly, the push-button 59 and locking member on the handle structure 18 may be used as to lock the handle structure 18 in place in the second handle structure receiving feature 58 and prevent inadvertent withdrawal of the handle structure 18 from the second handle structure receiving feature 58.

In the embodiment shown, the foot-deck-based vehicle 12 includes a first mounting surface 67 (FIGS. 7A and 7B) and the seat accessory structure 14 includes a second mounting surface 68 that is engageable with the first mounting surface 67 to detachably connect the seat accessory structure 14 to the foot-deck-based vehicle 12. In the embodiment shown, the seat accessory structure 14 further includes a first clip 70*a* and a second clip 70*b*, that assist the seat accessory structure 14 to be retained on the foot deck 16. The first and second clips 70*a* and 70*b* are resiliently movable out of the way to permit connection and disconnection of the seat accessory structure 14 with respect to the foot deck 16.

Independently of whether the first and second mounting surfaces 67 and 68 are provided, the seat accessory structure 14 may optionally include a first handle structure receiving feature mating feature 72 that is shaped to mate with the first handle structure receiving feature 48 in the foot deck 16, to at least partially connect the seat accessory structure 14 to the foot-deck-based vehicle 12. If the first and second mounting surfaces 67 and 68 are provided, then the optional provision of the first handle structure receiving feature mating feature 72 would partially connect the seat accessory structure 14 to the foot-deck-based vehicle 12. If no other mounting surfaces are provided between the seat accessory structure 14 and the foot-deck-based vehicle 12 (such as the first and second mounting surfaces 67 and 68), then the optional provision of the first handle structure receiving feature mating feature 72 would fully connect the seat accessory structure 14 to the foot-deck-based vehicle 12. In the embodiment shown, the first handle structure receiving feature mating feature 72 is similar to the handle structure projection 56, and is therefore a projection shaped to extend snugly into the receiving aperture 64 of the first handle structure receiving feature 48.

In some embodiments, the handle structure 18 may be referred to as a first handle structure 18, and the seat accessory structure 14 includes a second handle structure 65 that is positioned for gripping by the user 22 when the user is seated on the seat body 50. In such embodiments, the user 22 when seated on the seat body 50 would face towards the second end 24*b* of the foot deck 16.

Figure 6:
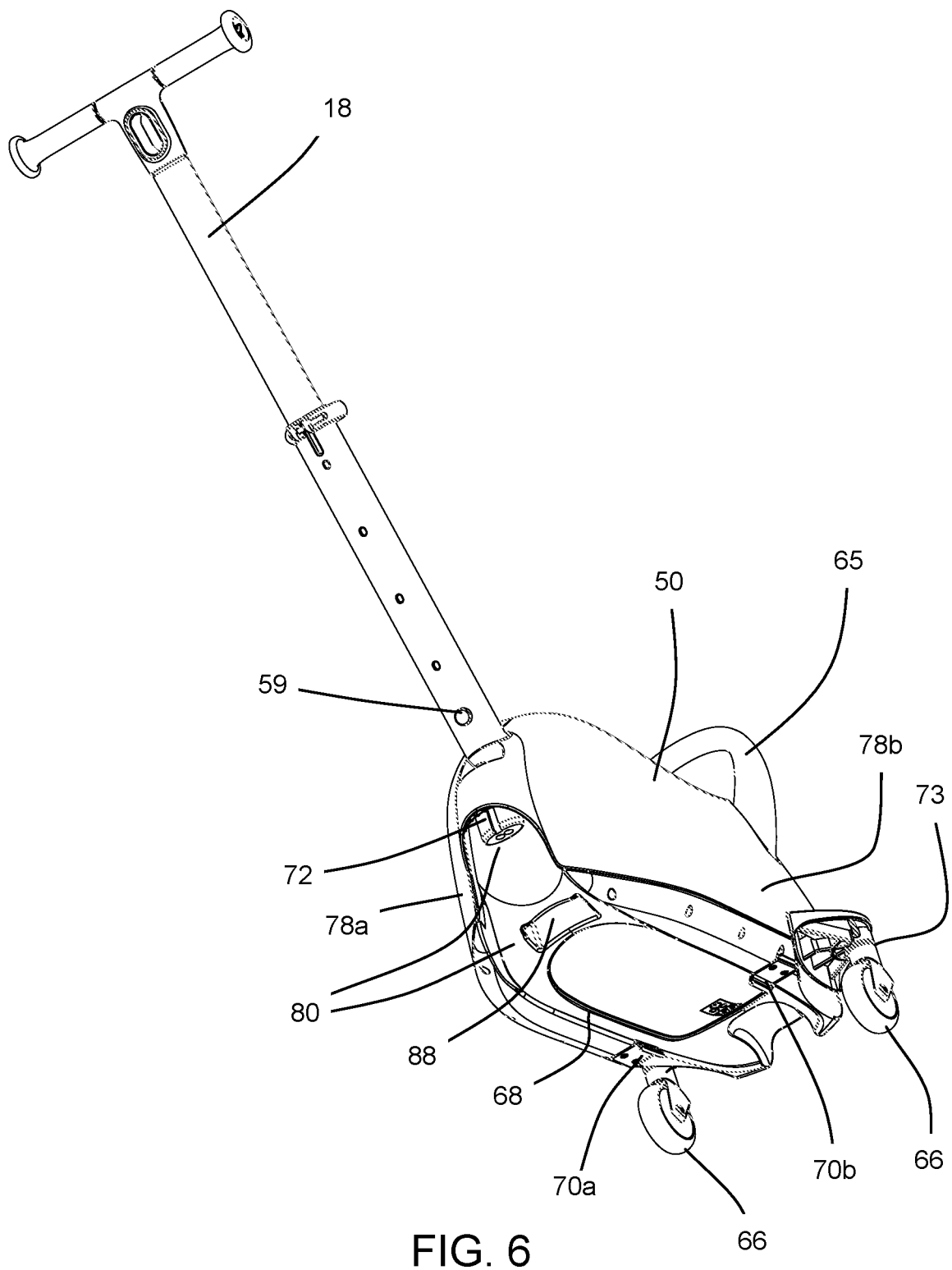
FIG. 6 is another perspective view of the seat-based vehicle shown in FIG. 1 during another stage of conversion for mounting to the foot-deck-based vehicle.
Figure 8:
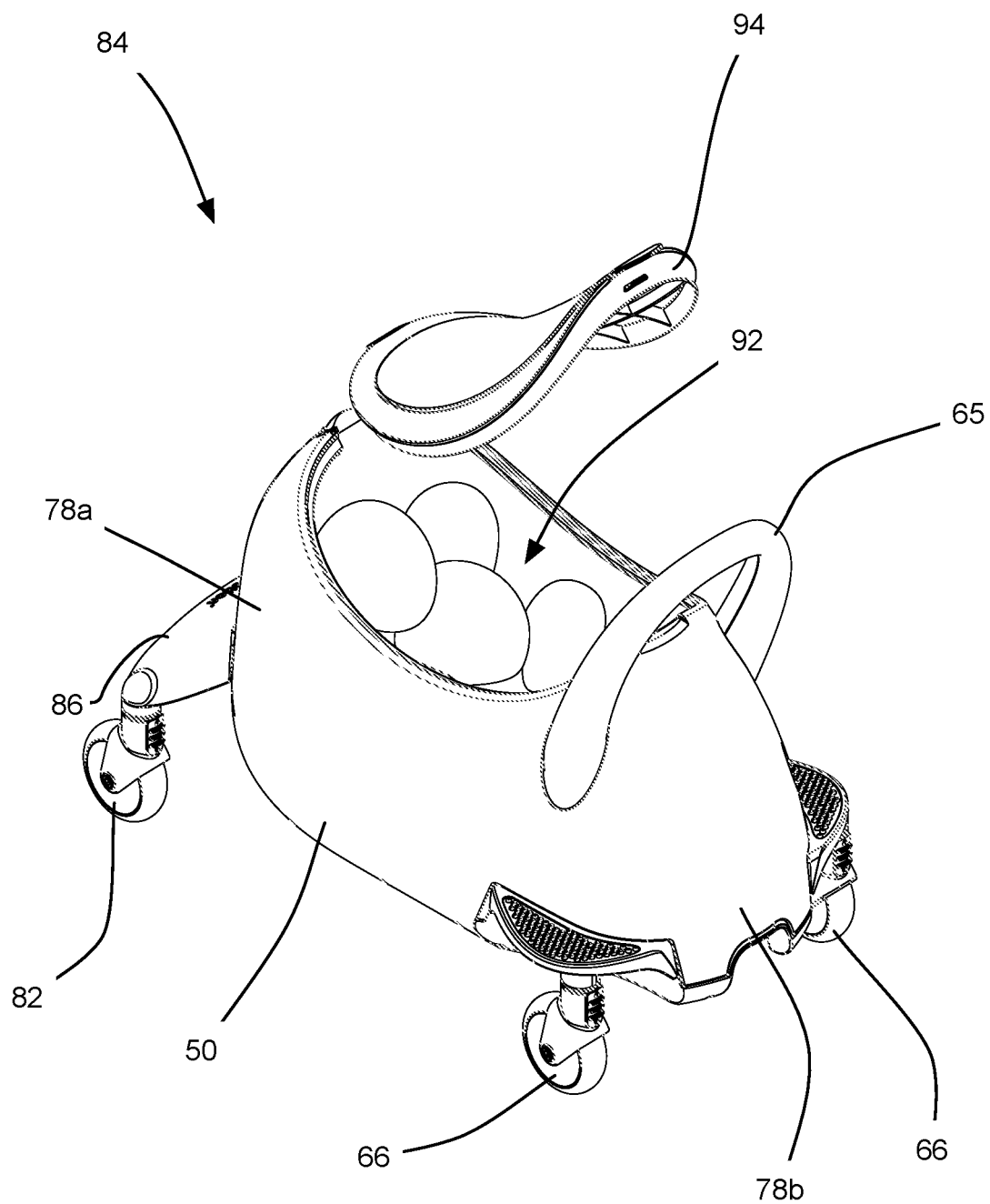
FIG. 8 is a perspective view of the seat-based vehicle shown in FIG. 1, illustrating a storage compartment that is optionally included therein.

As can be seen in FIG. 2, the seat accessory structure 14 may include at least one seat accessory structure wheel 66 that is positioned to cooperate with at least one of the plurality of foot-deck-based vehicle wheels 20 to support the seat-based vehicle 57 for rolling on the ground surface G. In the embodiment shown, the at least one seat accessory structure wheel 66 includes two seat accessory structure wheels 66 (FIGS. 6, 7A and 8). It will be understood, however that any suitable number of seat accessory structure wheels 66 may be provided, such as, one, three, four, or more.

The at least one seat accessory structure wheel 66 may be connected to the seat body 50 by a swivel connection 73 as best seen in FIG. 6. The swivel connection 73 may be a rotational connection for rotation about the vertical axis Avert, as shown, or alternatively about an axis that is angled relative to a vertical axis.

With reference to FIGS. 2 and 7A, in the embodiment shown, the aforementioned at least one of the plurality of foot-deck-based vehicle wheels 20 make up a first subset 74 of the plurality of foot-deck-based vehicle wheels 20 (i.e. not the entire plurality of foot-deck-based vehicle wheels 20). With reference to FIG. 7B, The first and second mounting surfaces 67 and 68 are positioned such that a second subset 76 of the plurality of foot-deck-based vehicle wheels 20 is raised off the ground surface G when the seat accessory structure 14 is connected to the foot-deck-based vehicle 12 via the first and second mounting surfaces 67 and 68. In the embodiment shown, the first subset 74 of the plurality of foot-deck-based vehicle wheels 20 includes the first and second front wheels 20*a* (i.e. any of the plurality of foot-deck-based vehicle wheels 20 that are positioned at the first end 24*a* of the foot deck 16), and the second subset 76 of the plurality of foot-deck-based vehicle wheels 20 includes the rear wheel 20*b* (i.e. any of the plurality of foot-deck-based vehicle wheels 20 positioned at the second end 24*b* of the foot deck 16).

With the seat-based vehicle 57 constructed as shown, the secondary person 60 can easily steer the seat-based vehicle 57 by simply applying a small torque on the handle structure 18, because the at least one seat accessory structure wheel 66 is mounted to the seat body 50 via a swivel connection.

The seat body 50 has a first end 78*a* and a second end 78*b*. When the seat accessory structure 14 is connected to the foot-deck-based vehicle 12, the first end 78a of the seat body 50 is at the first end 24a of the foot deck 16, and the second end 78b of the seat body 50 is at the second end 24b of the foot deck 16. As can be seen, in the embodiment shown, the at least one seat accessory structure wheel 66 is positioned at the second end 78b of the seat body 50. The seat body 50 optionally may include at least one auxiliary wheel mounting feature 80 that is positioned at the first end 78a of the seat body 50, and is positioned to detachably receive at least one auxiliary wheel 82 (shown in FIGS. 1, 5 and 8) in a position such that the at least one auxiliary wheel 82 and the at least one seat accessory structure wheel 66 together support the seat accessory structure 14 on the ground surface G when the seat accessory structure 14 is detached from the foot-deck-based vehicle 12, so as to form a seat-based vehicle 84 that is different than the seat-based vehicle 57. For the purposes of distinguishing from one another, the seat-based vehicle 57 may be referred to as a first seat-based vehicle 57 and the seat-based vehicle 84 may be referred to as a second seat-based vehicle 84.

The at least one auxiliary wheel 82 may include two auxiliary wheels 82 which are each mounted to an auxiliary wheel support 86 via a swivel connection. In the embodiment shown, the at least one auxiliary wheel mounting feature 80 is a single auxiliary wheel mounting feature, and includes the first handle structure receiving feature mating feature 72 and an orientation locking aperture 88 (FIG. 6). The auxiliary wheel support 86 includes an auxiliary wheel support receiving aperture 89 that may be shaped similarly to the receiving aperture 54 in the first handle structure receiving feature 48 (FIG. 4) and thus snugly receives the first handle structure receiving feature mating feature 72. The orientation locking aperture 88 may be a generally rectangular aperture that receives an orientation locking projection 90 on the auxiliary wheel support 86. By engagement of the orientation locking projection 90 with the orientation locking aperture 88, rotational movement of the auxiliary wheel support 86 relative to the seat body 50 is prevented.

It will be noted that the feature of raising the second subset 76 of the plurality of foot-deck-based vehicle wheels 20 off the ground surface G is advantageous regardless of whether the feature of having a handle structure 18 that is detachable from the foot-deck-based vehicle 12 and connectable to the seat accessory structure 14.

With reference to FIG. 8, the seat accessory structure 14 may include a storage chamber 92, and the seat body 50 may have, at a top end thereof, a cover 94 that is hingedly connected to the rest of the seat body 50 so as to be positionable in a closed position (FIGS. 1 and 2) to cover the storage chamber 92 and an open position (FIG. 8) to provide access to the storage chamber 92.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A vehicle system, comprising:
    a foot-deck-based vehicle, including:
        a foot deck, positioned to support a user, wherein the foot deck includes a first handle structure receiving feature;
        a handle structure that is detachably connectable to the first handle structure receiving feature, so as to be positioned for gripping by the user when the user is standing on the foot deck;
        a plurality of foot-deck-based vehicle wheels positioned to support the foot-deck-based vehicle for rolling on a ground surface; and
    a seat accessory structure having a seat body, wherein the seat accessory structure is detachably connectable to the foot deck so as to form a seat-based vehicle in which the seat body is positioned to support the user, wherein the seat accessory structure has a second handle structure receiving feature thereon, wherein the handle structure is detachably connectable to the second handle structure receiving feature, so as to be positioned for gripping by a secondary person when the secondary person is urging the seat-based vehicle to roll on the ground surface while the user is seated on the seat body,
    wherein the seat accessory structure includes at least one seat accessory structure wheel that is positioned to cooperate with at least one of the plurality of foot-deck-based vehicle wheels to support the seat-based vehicle for rolling on the ground surface,
    wherein said at least one of the plurality of foot-deck-based vehicle wheels make up a first subset of the plurality of foot-deck-based vehicle wheels and wherein the foot-deck-based vehicle includes a first mounting surface and the seat accessory structure includes a second mounting surface that is engageable with the first mounting surface to detachably connect the seat accessory structure to the foot-deck-based vehicle, and wherein the first and second mounting surfaces are positioned such that a second subset of the plurality of foot-deck-based vehicle wheels is raised off the ground surface when the seat accessory structure is connected to the foot-deck-based vehicle via the first and second mounting surfaces.

2. The vehicle system as claimed in claim 1, wherein the handle structure is a first handle structure and the seat accessory structure includes a second handle structure that is positioned for gripping by the user when the user is seated on the seat body.

3. The vehicle system as claimed in claim 2, wherein the foot deck has a first end and a second end, and the first handle structure receiving feature is at the first end and the second handle structure receiving feature is at the first end.

4. The vehicle system as claimed in claim 3, wherein the second handle structure is at the second end.

5. The vehicle system as claimed in claim 1, wherein the foot deck has a first end and a second end, and wherein the second subset of the plurality of foot-deck-based vehicle wheels includes any of the plurality of foot-deck-based vehicle wheels positioned at the second end of the foot deck.

6. The vehicle system as claimed in claim 1, wherein the foot deck has a first end and a second end, and wherein the seat body has a first end and a second end, and wherein, when the seat accessory structure is connected to the foot-deck-based vehicle, the first end of the seat body is at the first end of the foot deck and the second end of the seat body is at the second end of the foot deck, wherein the at least one seat accessory structure wheel is at the second end of the seat body.

7. The vehicle system as claimed in claim 6, wherein the at least one seat accessory structure wheel is connected to the seat body by a swivel connection.

8. The vehicle system as claimed in claim 7, wherein the first subset of the plurality of foot-deck-based vehicle wheels is connected to the foot deck via a lean-to-steer mechanism, and are positioned at the first end of the foot deck.

9. The vehicle system as claimed in claim 6, wherein the seat-based vehicle is a first seat-based vehicle, and wherein the at least one seat accessory structure wheel is positioned at the second end of the seat body, and wherein the seat body includes at least one wheel assembly mounting feature that is positioned at the first end of the seat body, and is positioned to detachably receive at least one auxiliary wheel in a position such that the at least one auxiliary wheel and the at least one seat accessory structure wheel together support the seat accessory structure on the ground surface when the seat accessory structure is detached from the foot-deck-based vehicle, so as to form a second seat-based vehicle.

10. The vehicle system as claimed in claim 1, wherein the seat accessory structure includes a first handle structure receiving feature mating feature that is shaped to mate with the first handle structure receiving feature to at least partially connect the seat accessory structure to the foot-deck-based vehicle.

11. The vehicle system as claimed in claim 10, wherein the first handle structure receiving feature includes a tube with a receiving aperture, and the first handle structure receiving feature mating feature is a projection that is shaped to extend snugly into the receiving aperture.

12. A vehicle system, comprising:
  a foot-deck-based vehicle, including:
    a foot deck, positioned to support a user;
    a handle structure that is connected to the foot deck so as to be positioned for gripping by the user when the user is standing on the foot deck;
    a plurality of foot-deck-based vehicle wheels positioned to support the foot-deck-based vehicle for rolling on a ground surface; and
  a seat accessory structure having a seat body, wherein the seat accessory structure is detachably connectable to the foot-deck-based vehicle so as to form a seat-based vehicle in which the seat body is positioned to support the user,
  wherein the seat accessory structure includes at least one seat accessory structure wheel that is positioned to cooperate with a first subset of the plurality of foot-deck-based vehicle wheels and wherein the foot-deck-based vehicle includes a first mounting surface and the seat accessory structure includes a second mounting surface that is engageable with the first mounting surface to detachably connect the seat accessory structure to the foot-deck-based vehicle, and wherein the first and second mounting surfaces are positioned such that a second subset of the plurality of foot-deck-based vehicle wheels is raised off the ground surface when the seat accessory structure is connected to the foot-deck-based vehicle via the first and second mounting surfaces.

13. The vehicle system as claimed in claim 12, wherein the second subset of the plurality of foot-deck-based vehicle wheels includes any of the plurality of foot-deck-based vehicle wheels positioned at the second end of the foot deck.

14. The vehicle system as claimed in claim 12, wherein the seat accessory structure has a first end and a second end, and wherein, when the seat accessory structure is connected to the foot-deck-based vehicle, the first end of the seat accessory structure is at a first end of the foot deck and the second end of the seat accessory structure is at a second end of the foot deck, wherein the plurality of seat accessory structure wheels are at the second end of the seat accessory structure.

15. The vehicle system as claimed in claim 14, wherein each seat accessory structure wheel of the plurality of seat accessory structure wheels are connected to the seat body by a swivel connection.

16. The vehicle system as claimed in claim 15, wherein the first subset of the plurality of foot-deck-based vehicle wheels is connected to the foot deck via a lean-to-steer mechanism, and are positioned at the first end of the foot deck.

17. The vehicle system as claimed in claim 15, wherein the plurality of seat accessory structure wheels are positioned at the second end of the seat body and wherein the seat body includes at least one wheel assembly mounting feature that is positioned at the first end of the seat body, and is positioned to detachably receive at least one auxiliary wheel, wherein the at least one auxiliary wheel and the plurality of seat accessory structure wheels together support the seat accessory structure on the ground surface when the seat accessory structure is detached from the foot-deck-based vehicle.

* * * * *